United States Patent Office.

ALEXANDER G. NYE, OF WEYMOUTH, MASSACHUSETTS.

Letters Patent No. 61,017, dated January 8, 1867.

IMPROVED METHOD OF SEPARATING HARD RUBBER FROM PORCELAIN TEETH.

*The Schedule referred to in these Letters Patent and making part of the same.*

TO ALL PERSONS TO WHOM THESE PRESENTS SHALL COME:

Be it known that I, ALEXANDER G. NYE, of Weymouth, in the county of Norfolk, and State of Massachusetts, have made a new and useful invention having reference to the Detaching of Artificial Teeth from a mass or body of vulcanite, or a vulcanized composition of which caoutchouc may constitute a material part; and I do hereby declare the same to be described as follows:

Dentists find it very difficult, without breaking more or less of their teeth, to separate them from vulcanized India rubber or vulcanite, after having been prepared for being worn in the mouth of a person. It frequently happens that a set of teeth composed of "vulcanite" may not fit the mouth or part thereof destined for its reception, in which case it is desirable to detach the teeth from the vulcanite for the purpose of applying them to another mass or mouth-plate thereof. I have discovered a mode of easily accomplishing this or enabling it to be accomplished without any danger of breakage of the teeth or the separation of their holding spurs or wires from them.

In carrying out my process, I immerse, in a bath of boiling oil, fat, or grease, the mass of vulcanite containing the teeth to be extracted from it. The temperature of the oil, fat, or grease should be about three hundred degrees (Fahrenheit.) In this bath the vulcanite and teeth should be suffered to remain about five minutes, or until the oil or the heat thereof may have softened the vulcanite and the hot liquid may have more or less penetrated the teeth sockets thereof. Next the vulcanite, with the teeth, should be removed from the hot oil or fat and the teeth be extracted from the vulcanite by pincers or other suitable means. The object of the oil bath is to uniformly heat the teeth and vulcanite, so as to prevent the teeth from being broken and to enable them to be readily detached from the vulcanite without destroying their connection with their metallic spurs.

When a spirit lamp or flame is applied to the teeth for the purpose of softening the vulcanite it is apt to crack or break the teeth, but the hot bath of oil or fat will not crack them, and by penetrating into their sockets will operate to so destroy or impair the cohesion of the vulcanite with the teeth as to enable them to be easily detached from it.

I claim as my invention—

The employment of a bath of heated or boiling fat or oil in connection with one or more teeth and a mass of vulcanite, in manner and for the purpose as specified.

ALEXR. G. NYE.

Witnesses:
   R. H. EDDY,
   F. P. HALE, Jr.